US012261810B2

(12) United States Patent
Szubbocsev

(10) Patent No.: US 12,261,810 B2
(45) Date of Patent: Mar. 25, 2025

(54) SHARING EXTERNALLY CAPTURED CONTENT IN COMMUNICATIONS

(71) Applicant: Micron Technology, Inc., Boise, ID (US)

(72) Inventor: Zoltan Szubbocsev, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/526,841

(22) Filed: Nov. 15, 2021

(65) Prior Publication Data

US 2023/0155968 A1 May 18, 2023

(51) Int. Cl.
| | |
|---|---|
| *H04L 51/10* | (2022.01) |
| *B60R 11/04* | (2006.01) |
| *H04L 65/1069* | (2022.01) |
| *H04N 5/268* | (2006.01) |
| *H04N 23/90* | (2023.01) |
| *H04W 4/40* | (2018.01) |

(52) U.S. Cl.
CPC .............. *H04L 51/10* (2013.01); *B60R 11/04* (2013.01); *H04L 65/1069* (2013.01); *H04N 5/268* (2013.01); *H04N 23/90* (2023.01); *H04W 4/40* (2018.02)

(58) Field of Classification Search
CPC ..... H04L 51/10; H04L 65/1069; H04L 51/58; H04L 65/612; H04L 65/1059; B60R 11/04; H04N 5/247; H04N 5/268; H04N 23/90; H04W 4/40; H04W 4/44; H04W 4/48; H04W 4/80; H04W 12/001; H04W 12/003; H04W 12/06; H04W 12/009; H04W 12/04071; H04W 12/00503; H04W 12/00522; G06K 7/1417; B60W 50/14

USPC ........................................................ 709/204
See application file for complete search history.

(56) References Cited

U.S. PATENT DOCUMENTS

| | | | | |
|---|---|---|---|---|
| 8,855,575 | B2 * | 10/2014 | Heines ..................... | G06F 8/70 |
| | | | | 455/66.1 |
| 9,229,623 | B1 * | 1/2016 | Penilla ................ | H01M 50/249 |
| 9,460,601 | B2 * | 10/2016 | Mimar .................... | G08B 21/06 |
| 10,032,318 | B1 * | 7/2018 | Ferguson ............. | G07C 5/0816 |
| 2014/0220948 | A1 * | 8/2014 | Xia ....................... | H04W 4/046 |
| | | | | 455/415 |

(Continued)

FOREIGN PATENT DOCUMENTS

KR  10-1257025 B1  4/2013

OTHER PUBLICATIONS

"International Search Report and Written Opinion of the International Searching Authority," issued in connection with Int'l Appl. No. PCT/US2022/079107, dated Mar. 7, 2023 (9 pages).

*Primary Examiner* — James N Fiorillo
(74) *Attorney, Agent, or Firm* — Holland & Hart LLP

(57) ABSTRACT

Methods, systems, and devices for communications are described. A connection may be established between a remote device that includes an imaging device and a device. Based on establishing the connection, first visual data associated with the imaging device may be received at the device. A second connection between the device and a communication device may be established, where communications between the device and the communication device may be supported via an application running at the device. Based on establishing the second connection, the visual data may be transmitted from the mobile device to the communication device via the application.

21 Claims, 8 Drawing Sheets

(56) References Cited

U.S. PATENT DOCUMENTS

| | | | | |
|---|---|---|---|---|
| 2016/0065903 | A1* | 3/2016 | Wang | G06F 3/013 |
| | | | | 348/148 |
| 2016/0267335 | A1* | 9/2016 | Hampiholi | G08B 21/06 |
| 2016/0311401 | A1* | 10/2016 | Altawil | B60R 25/1004 |
| 2017/0059326 | A1* | 3/2017 | Zhang | G01C 21/1656 |
| 2017/0111587 | A1* | 4/2017 | Herbst | H04N 5/3698 |
| 2017/0237986 | A1* | 8/2017 | Choi | H04W 4/80 |
| | | | | 348/14.02 |
| 2017/0251331 | A1* | 8/2017 | Green | H04L 67/12 |
| 2017/0303326 | A1* | 10/2017 | Kwon | H04W 8/005 |
| 2017/0341611 | A1* | 11/2017 | Baker | B60R 21/16 |
| 2018/0072190 | A1* | 3/2018 | Kowalski | B60N 2/0244 |
| 2018/0102051 | A1* | 4/2018 | Suthar | G08G 1/04 |
| 2018/0181359 | A1* | 6/2018 | Monroe | B60Q 3/51 |
| 2018/0183855 | A1* | 6/2018 | Sabella | G06F 9/5072 |
| 2019/0014604 | A1* | 1/2019 | Gerlach | H04W 76/14 |
| 2019/0141276 | A1* | 5/2019 | Galluzzi | H04N 7/181 |
| 2019/0342622 | A1* | 11/2019 | Carrigan | H04N 21/21805 |
| 2019/0375357 | A1* | 12/2019 | Mezaael | B60R 11/04 |
| 2020/0294164 | A1* | 9/2020 | Redmon | G06Q 30/0185 |
| 2020/0349345 | A1* | 11/2020 | Hodge | G06V 20/59 |
| 2020/0367056 | A1* | 11/2020 | Hodge | H04W 12/009 |
| 2020/0383157 | A1* | 12/2020 | Lee | H04W 36/18 |
| 2021/0097315 | A1* | 4/2021 | Carruthers | G08B 13/19645 |
| 2021/0339759 | A1* | 11/2021 | Fouad | B60W 50/14 |
| 2022/0024476 | A1* | 1/2022 | Lund | B60K 35/80 |
| 2022/0237996 | A1* | 7/2022 | Hodge | G08B 13/19645 |
| 2022/0410895 | A1* | 12/2022 | Salter | B60L 53/36 |
| 2023/0007156 | A1* | 1/2023 | Bowers | H04N 23/689 |
| 2023/0047028 | A1* | 2/2023 | Redmon | H04W 4/02 |
| 2023/0155968 | A1* | 5/2023 | Szubbocsev | H04L 65/612 |
| | | | | 709/204 |

* cited by examiner

SHARING EXTERNALLY CAPTURED CONTENT IN COMMUNICATIONS

FIELD OF TECHNOLOGY

The following relates generally to one or more systems and techniques that support communications between devices, including for sharing externally captured content in communications.

BACKGROUND

Devices that have access to a network (e.g., a wired or wireless network) may be programmed with applications that support user-to-user communications between the devices. These applications may include text, voice, or video-based messaging applications (e.g., short message service (SMS) applications, chat applications, etc.), voice-based calling applications (e.g., phone applications), and video-based calling applications (e.g., video conferencing applications). Video-based calling applications may enable users to share with each other video taken by his or her respective devices. In some examples, an application includes a combination of text-based, voice-based, and video-based functionalities.

DETAILED DESCRIPTION

A mobile device may be used to establish, with another device, a connection that supports user-to-user communications (e.g., a voice call or video call) while a vehicle is being operated. Based on establishing the connection, the user of the mobile device may desire to share details of his or her surroundings with the user of the other device. To do so, the user of the mobile device may enable a video calling functionality of the mobile device and may use an imaging device at the mobile device (e.g., a rear-facing camera) to capture the surroundings. However, using the imaging device at the mobile device to capture the surroundings may result in a poor experience for the other user (e.g., if the view of the camera is obstructed by the interior of the vehicle), raise safety concerns (e.g., if the driver is using the mobile device), raise property damage concerns (e.g., if the mobile device is positioned outside of the vehicle), or any combination thereof.

To enable a mobile device to share visual aspects of a surrounding environment with increased quality, reduced risk to the mobile device, reduced risk to the driver, or a combination thereof, imaging devices at a remote device (e.g., a vehicle, observation tower, etc.) may be used by the mobile device instead of the imaging devices at the mobile device. That is, the mobile device may share, with a connected communications device, visual data captured by the imaging devices at the remote device. By sharing, by a mobile device, the visual data captured by a remote device (such as a vehicle), a mobile device may be used to share unobstructed visual data with another device with reduced risks to safety and property.

Figure 1:
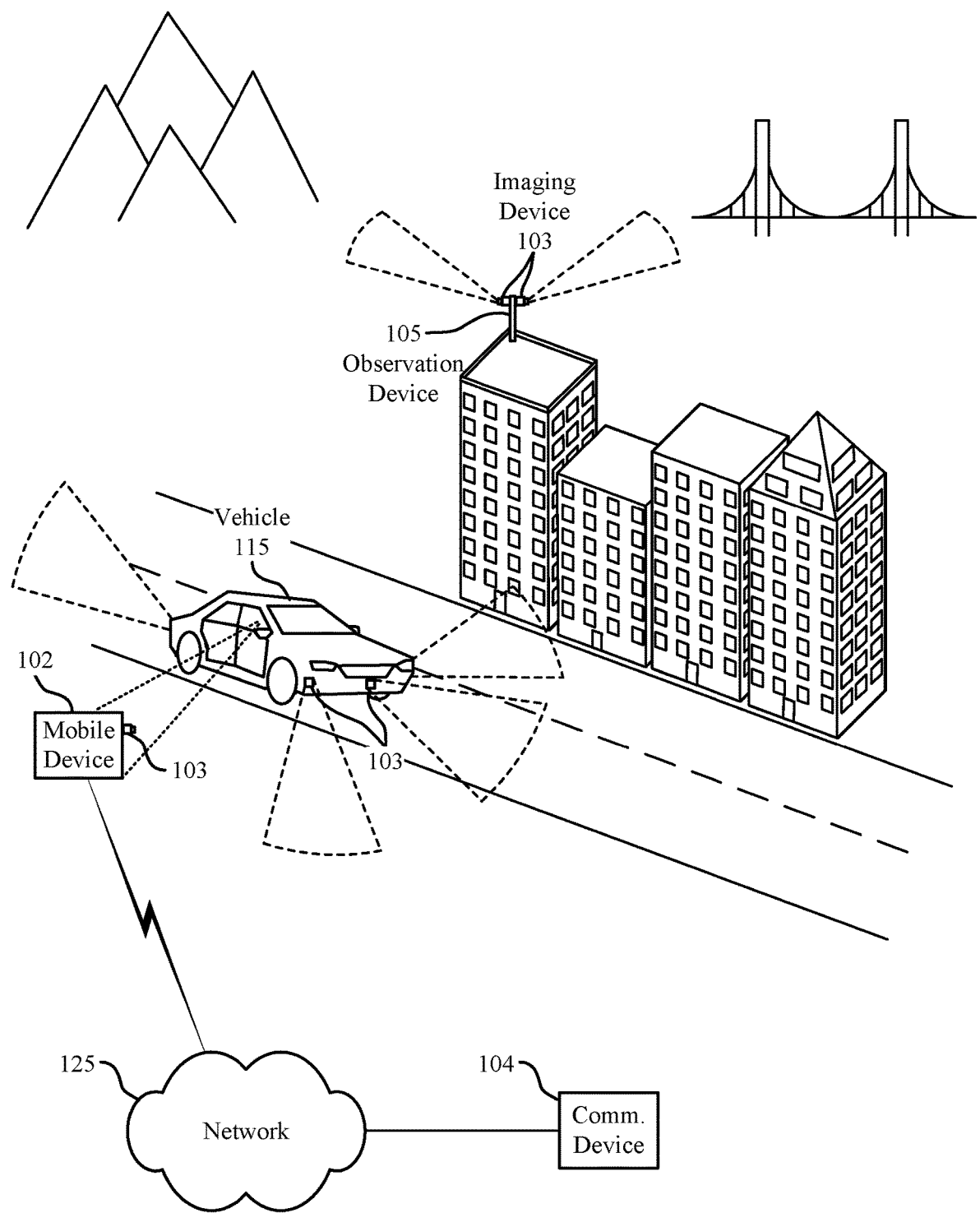
FIG. 1 shows an example of a system that supports sharing externally captured content in communications in accordance with examples as described herein.

FIG. 1 shows an example of a system that supports sharing externally captured content in communications in accordance with examples as described herein. System 100 may include vehicle 115, mobile device 102, communications device 104, network 125, and observation device 105.

Vehicle 115 may be a motor vehicle (such as a motorcycle, car, sport utility vehicle, truck, bus, or tractor trailer), a railed vehicle (such as a train, tram, or trolley); a watercraft (such as a ship or boat), an aircraft (such as an airplane, helicopter, or aerostat, a spacecraft, or an amphibious vehicle. Vehicle 115 may be equipped with a set of sensors. The set of sensors may include one or more imaging devices 103 (e.g., a dashcam, backup camera, radar, lidar, or other imaging devices). The imaging devices 103 may be configured to capture still images (e.g., still cameras), moving images (e.g., video cameras), other types of images (e.g., radar or lidar), or a combination thereof. In some examples, the imaging devices 103 may be configured to capture images outside the visible light spectrum (e.g., in the infrared spectrum). Additionally, or alternatively, the imaging devices 103 may be configured to capture visual data at night (e.g., using night-vision technology). The imaging devices 103 may also be configured to capture audio.

The imaging devices 103 may be distributed across vehicle 115 to capture different views. For example, vehicle 115 may include cameras at its rear, on its driver-side, its passenger-side, and its front. The different cameras may be used to capture overlapping and non-overlapping visual data relative to vehicle 115. In some examples, vehicle 115 may use the visual data captured by the imaging devices 103 to support autonomous driving operations.

Mobile device 102 may be a personal electronic device, such as a mobile phone, a laptop, a personal computer, a tablet, an electronic reader, or the like. Mobile device 102 may also be a wireless device. Mobile device 102 may be equipped with one or more imaging devices 103. In some examples, the imaging devices 103 at mobile device 102 are configured differently than the imaging devices 103 at vehicle 115. For example, one or both of hardware or functionality of the imaging devices 103 at mobile device 102 may be different than one or both of a hardware or functionality of the imaging devices 103 at vehicle 115. Mobile device 102 may be located with vehicle 115. In some examples, multiple mobile devices (including mobile device 102) may be included in vehicle 115. In some examples, mobile device 102 may be integrated with vehicle 115 (e.g., built-into or detachable from a dashboard of the vehicle).

Mobile device 102 may be capable of communicating with other devices (e.g., via a text, voice, or data network). Mobile device 102 may run one or more applications (e.g., software applications). In some examples, a communications application is installed at mobile device 102 that enables mobile device 102 to support communications (e.g., text communications, voice communications, video communications) with other devices, such as communications device 104.

Mobile device 102 may wirelessly access the network 125. Network 125 may be a communications network (e.g., a network that support text, voice, or video communications). In some examples, network 125 may be a data network (e.g., the Internet). Mobile device 102 may gain access to network 125 via an access network, such as a cellular network, a satellite network, or some other network that supports wireless data transfer. Network 125 may provide mobile device 102 access to other devices that are connected to network 125, such as communications device 104. In some examples, vehicle 115 may wirelessly gain access to network 125. Also, observation device 105 may wirelessly gain access to network 125.

Communications device 104 may be capable of communicating with other devices (e.g., via a text, voice, or data network). Communications device 104 may be a personal electronic device, such as a mobile phone, a laptop, a desktop, a personal computer, a tablet, an electronic reader, or the like. Communications device 104 may be a wired or a wireless device. Communications device 104 may gain access to network 125 via an access network, such as a cellular network, a satellite network, or a wired network (e.g., a cable network, digital subscriber line network, etc.).

Observation device 105 may be a device (e.g., a pole or tower) that is configured to observe an environment that is within a line of sight of observation device 105. Observation device 105 may be equipped with one or more imaging devices 103. In some examples, the imaging devices 103 at observation device 105 are configured differently than the imaging devices 103 at vehicle 115, at mobile device 102, or both. For example, the imaging devices 103 at vehicle 115 may use different hardware (e.g., larger hardware with additional, higher quality, increased complexity image sensors, larger lenses, etc.) and have different functionality (e.g., increased magnification abilities, enhanced image processing capabilities, etc.) than the imaging devices 103 at vehicle 115, at mobile device 102, or both.

In some examples, mobile device 102 may be used to establish, with another device (e.g., communications device 104), a connection that supports user-to-user communications (e.g., a voice call or video call) while in vehicle 115 (e.g., while vehicle 115 is being driven). Based on establishing the connection, the user of mobile device 102 may desire to share details of his or her surroundings with the user of the other device. To do so, the user of mobile device 102 may enable a video calling functionality of mobile device 102 and may use an imaging device 103 at mobile device 102 (e.g., a rear-facing camera) to capture the surroundings. However, using the imaging device 103 at mobile device 102 to capture the surroundings may result in a poor experience for the other user (e.g., if the view of the camera is obstructed by the interior of the vehicle), raise safety concerns (e.g., if the driver is using mobile device 102), raise property damage concerns (e.g., if mobile device 102 is positioned outside of vehicle 115), or any combination thereof.

To enable a mobile device to share visual aspects of a surrounding environment with increased quality, reduced risk to the mobile device, reduced risk to the driver, or a combination thereof, imaging devices at a remote device (e.g., a vehicle, observation tower, etc.) may be used by the mobile device instead of the imaging devices at the mobile device. That is, the mobile device may share, with a connected communications device, visual data captured by the imaging devices at the remote device. A remote device may be a device that is physically separate from mobile device 102, that uses different processing circuitry than mobile device 102, whose internal operation is not controllable by mobile device 102, or any combination thereof.

In some examples, an application that supports wireless communication of text, voice, video, or any combination thereof, at mobile device 102 may be activated. Prior to or after the application is activated, a connection between mobile device 102 and vehicle 115 may be established. The connection may be a wireless connection (e.g., using Bluetooth or Wi-Fi) or a wired connection (e.g., using a universal serial bus (USB) connection). Based on establishing the connection, visual data captured by vehicle 115 may be received at mobile device 102. A second connection between mobile device 102 and communications device 104 may also be established (e.g., via a wireless access network and a data network). Based on establishing the second connection, the visual data captured by vehicle 115 may be transmitted from mobile device 102 to communications device 104 via the application.

By sharing, by a mobile device, the visual data captured by a remote device (such as a vehicle), a mobile device may be used to share unobstructed visual data with another device with reduced risks to safety and property.

Figure 2A:
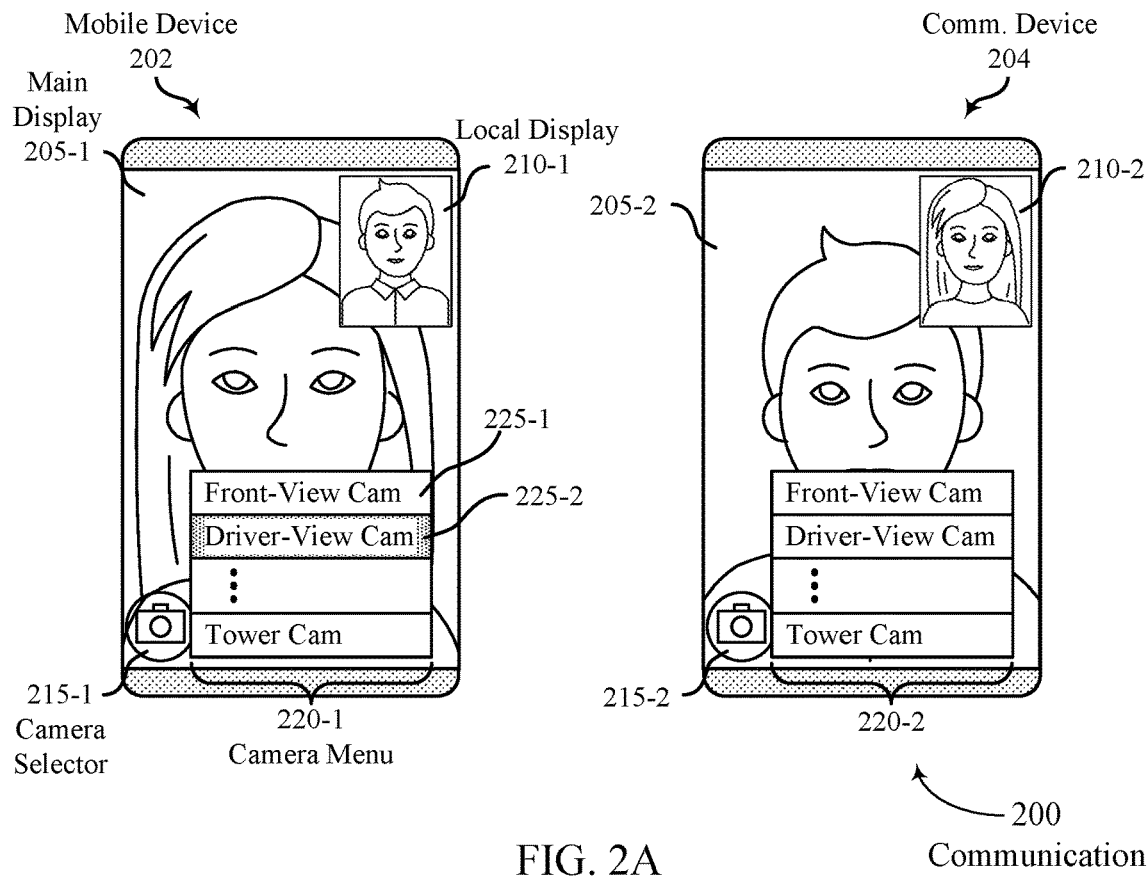
FIGS. 2A and 2B show examples of a communication that supports sharing externally captured content in accordance with examples as described herein.

FIG. 2A shows an example of a communication that supports sharing externally captured content in accordance with examples as described herein. Communication 200 depicts aspects of a communication between two devices (mobile device 202 and communications device 204). Mobile device 202 and communications device 204 may be respective examples of mobile device 102 and communications device 104 of FIG. 1. In some examples, one or both of mobile device 202 and communications device 204 may not be equipped with imaging devices.

Mobile device 202 may include first main display 205-1 and first local display 210-1. First main display 205-1 may display data generated by a communications application, including visual data (e.g., a video feed, a photo, etc.) received from communications device 204, icons for accessing functionality of the communications application (e.g., first camera selector icon 215-1), and menus for selecting functionality of the communications application (e.g., first camera menu 220-1). First local display 210-1 may also display data generated by the communications application, including visual data generated at mobile device 202 (e.g., a video feed being captured by mobile device 202). Communications device 204 may similarly include second main display 205-2 and local display 210-2. Also, communications device 204 may similarly run a different instance of the communications application being run at mobile device 202.

As described herein, mobile device 202 may have access to imaging devices at remote devices, such as a vehicle or observation tower. In some examples, a user of mobile device 202 may desire to share, with a user of communications device 204, visual data captured by the imaging devices at the remote devices rather than the visual data captured by mobile device 202. In such cases, the user of mobile device 202 may toggle first camera selector icon 215-1 (e.g., by touching the corresponding area of first main display 205-1). In some examples, first camera selector icon 215-1 may be a transparent icon or a hidden icon that is revealed when a corresponding screen area (e.g., the lower left portion of first main display 205-1) is touched.

First camera menu 220-1 may be presented to the user based on toggling first camera selector icon 215-1, where first camera menu 220-1 may include a list of available cameras, including a front-view or rear-view camera of mobile device 202, a front-view, driver-view camera, passenger-view camera, rear-view camera, or interior-view camera of a vehicle, a nearby tower camera, or a combination thereof. If no remote cameras are available, first camera selector icon 215-1 may be greyed out or omitted from the display entirely. In some examples, first option 225-1 of first camera menu 220-1 may be used to select a front-view camera of a vehicle and second option 225-2 of first camera menu 220-1 may be used to select a driver-view camera of the vehicle. In some examples, mobile device 202 may receive (e.g., from a user) a command to disable one or more of the available cameras (e.g., prior to establishing a call or during a call) such that the one or more disabled cameras will not be accessible by mobile device 202, communications device 204, or both.

Communications device 204 may similarly display second camera selector icon 215-2 and second camera menu 220-2. In such cases, communications device 204 may receive an indication of the set of available cameras accessible to mobile device 202. To receive the indication of the set of available cameras, communications device 204 may transmit a message to mobile device 202 inquiring whether mobile device 202 has access to cameras other than the cameras at mobile device 202.

Based on opening first camera menu 220-1, mobile device 202 may receive (e.g., from a user of mobile device 202) a selection of one of the options 225 and, thus, one of the available cameras. Additionally, or alternatively, communications device 204 may receive a selection of one of the options in second camera menu 220-2, and thus, one of the available cameras. In such cases, communications device 204 may transmit an indication of the selected option to mobile device 202. In some examples, based on receiving, at mobile device 202, the selection from communications device 204, a prompt may be displayed at mobile device requesting permission to transmit the visual data captured by the selected camera to communications device 204. In some examples, first camera menu 220-1 may include an operation to search for available external imaging devices with which to connect. Such a button may initiate an operation to search for available imaging devices, connect with identified imaging devices, or a combination thereof.

Figure 2B:
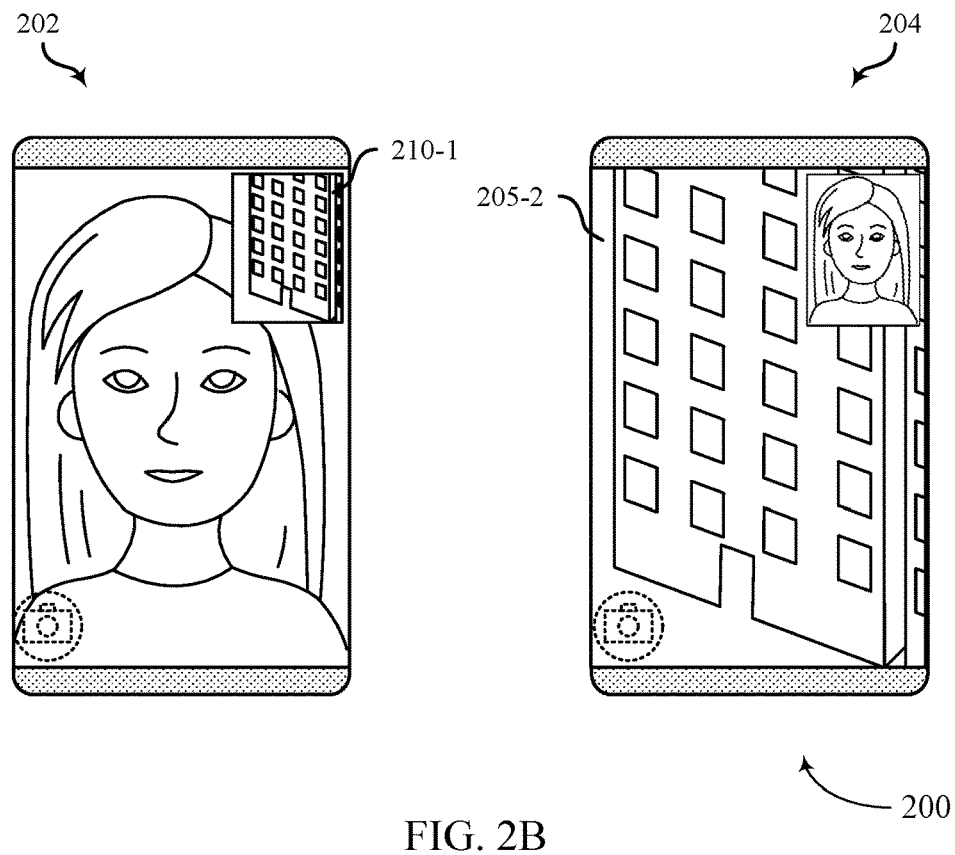

FIG. 2B shows an example of the communication sharing externally captured content in accordance with examples as described herein. Based on receiving a selection of the driver-view camera of a connected vehicle, mobile device 202 may transmit visual data captured by (or being captured by) the driver-view camera to communications device 204. Accordingly, the visual data of the driver-view camera may be displayed in second main display 205-2. In some examples, the visual data of the driver-view camera is displayed in second main display 205-2 in place of the visual data captured by a camera on mobile device 202. In other examples, the visual data of the driver-view camera is displayed on second main display 205-2 with the visual data captured by a camera on mobile device 202 (e.g., in a split-screen view).

In some examples, the visual data being transmitted, by mobile device 202 to communications device 204, may be displayed at mobile device 202 within first local display 210-1. When multiple sets of visual data from multiple cameras is being transmitted to communications device 204, first local display 210-1 may be used to display one or both of the multiple sets.

In some examples, a selection of a different camera (e.g., a front-view camera of the vehicle) may be selected at mobile device 202 or communications device 204, and mobile device 202 may transmit the visual data of the different camera to communications device 204—e.g., instead of or in addition to the current sets of visual data being transmitted to communications device 204. In some examples, mobile device 202 or communications device 204 may receive a selection of multiple cameras. In such cases, mobile device 202 may transmit multiple set of visual data from the multiple cameras to communications device 204, which may view the multiple sets of visual data at a same time (e.g., in a split-screen view) or alternately.

Although depicted in FIGS. 2A and 2B in the context of video calling, the ability to share visual data captured at remote devices may similarly be used when mobile device 202 and communications device 204 are supporting communications using text messaging or voice calling.

Figure 3:
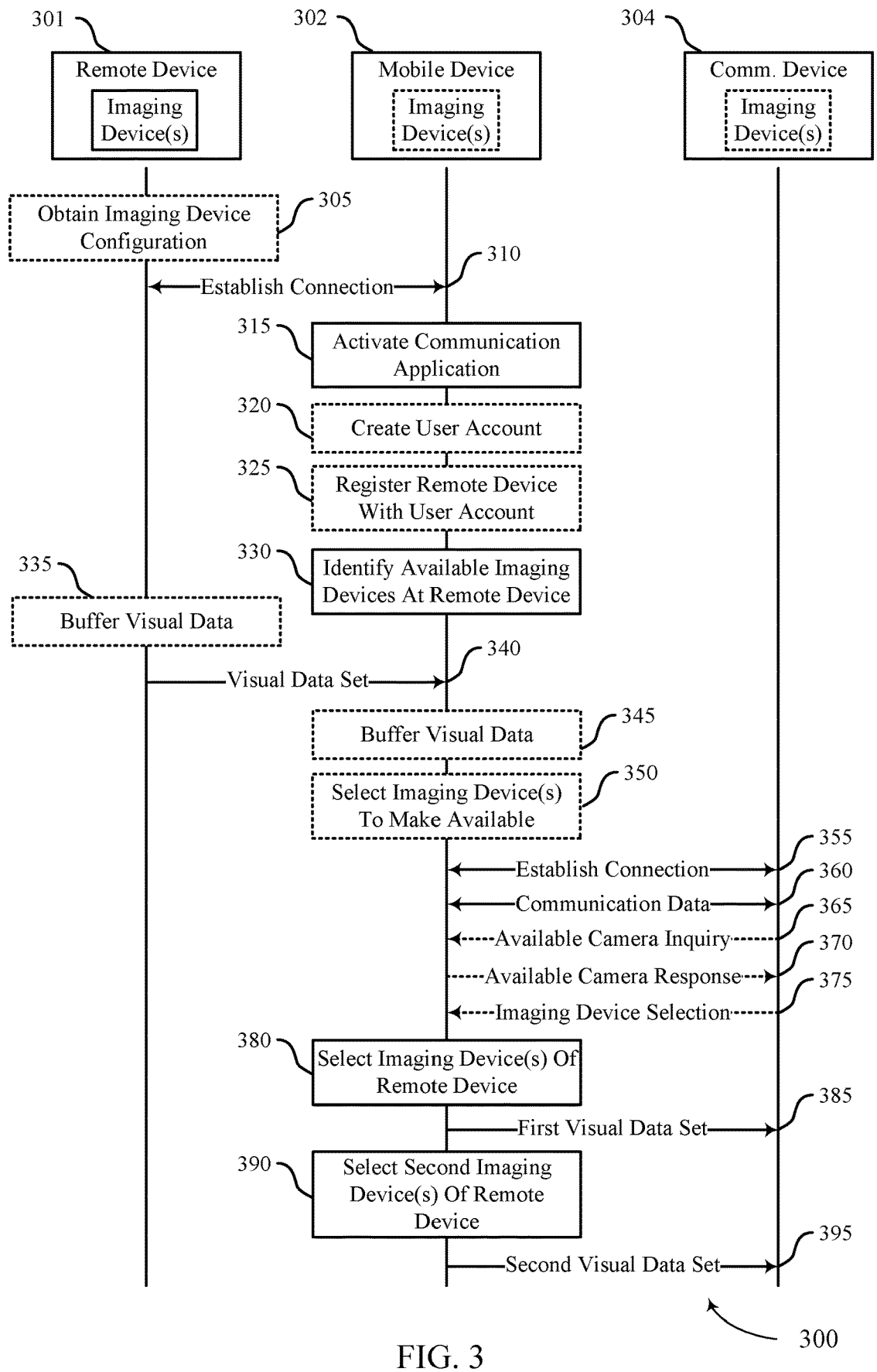
FIG. 3 shows an example set of operations that supports sharing externally captured content in accordance with examples as described herein.

FIG. 3 shows an example set of operations that supports sharing externally captured content in accordance with examples as described herein.

Process flow 300 may be performed by remote device 301, which may be an example of a vehicle or observation tower described with reference to FIG. 1, mobile device 302, and communications device 304, which may be respective examples of mobile device and communications device described with reference to FIGS. 1 and 2. In some examples, remote device 301 may be a device that is external to mobile device 302 and equipped with imaging devices. One or more remote device 301, mobile device 302, and communications device 304 may include imaging devices, where an imaging device may be a camera, a video camera, a ranging device, or any combination thereof.

In some examples, process flow 300 illustrates an example sequence of operations performed to support sharing externally captured content in communications. For example, process flow 300 depicts operations for establishing a connection between a remote device and a mobile device to enable the mobile device to access imaging devices at the remote device, and operations for transmitting, by a mobile device to a communications device, visual data captured at a remote device within a communications application.

One or more of the operations described in process flow 300 may be performed earlier or later in the process, omitted, replaced, supplemented, or combined with another operation. Also, additional operations described herein that are not included in process flow 300 may be included.

At 305, remote device 301 may obtain an imaging device configuration. In some examples, the imaging device configuration may be configured during a manufacturing process—e.g., a manufacturer may select which of the imaging devices at the remote device are to be accessible. In some examples, the imaging device configuration may configure a first set of the imaging devices at remote device 301 to be accessible to a first set of users (e.g., end users) and a second set of the imaging devices at remote device 301 to be accessible to a second set of users (e.g., the manufacturer or authorized parties).

At 310, a connection between remote device 301 and mobile device 302 may be established. In some examples, the connection between remote device 301 and mobile device 302 is established in accordance with a protocol, where the protocol includes exchanging messages for determining whether remote device 301 has one or more imaging devices that are accessible to other devices. For example, mobile device 302 may transmit a message to remote device 301 inquiring whether remote device 301 has imaging devices that are accessible to mobile device 302, and remote device 301 may respond with a message indicating a set of imaging devices that are accessible to mobile device 302. In some examples, the response message indicates different sets of imaging devices based on characteristics of mobile device 302 (e.g., a type of device, an identifier of mobile device 302, authentication credentials provided by the mobile device, etc.). In some examples, remote device 301 may establish connections with multiple mobile devices, including mobile device 302.

Different protocols may be used to establish an initial communication link between remote device 301 and mobile device 302 over which the connection between remote device 301 and mobile device 302 may be established. The initial communication link may be established using a short-range wireless communication technology. For example, a Bluetooth link, a Wi-Fi link, or a wired link (e.g., using a USB protocol) may be used to establish the initial communication link.

In some examples, before indicating the set of available imaging devices, remote device 301 may request authentication credentials from mobile device 302, or mobile device 302 may provide authentication credentials with the initial inquiry message. Additionally, or alternatively, remote device 301 may broadcast that one or more imaging devices at remote device 301 are available for mobile devices to access.

In some examples, the connection between remote device 301 and mobile device 302 may be established automatically when mobile device 302 enters a proximity of remote device 301 (e.g., when mobile device 302 enters a vehicle). Additionally, or alternatively, the connection between remote device 301 and mobile device 302 may be established after a communications application at mobile device is activated. Additionally, or alternatively, the connection between remote device 301 and mobile device 302 may be established after an initial setup procedure for registering remote device 301 with the application is completed.

At 315, a communications application may be activated at mobile device 302 (e.g., by a user input or automatically). The communications application may be used to send text, voice, or media (e.g., photo, video, etc.) messages between users of the application. Additionally, or alternatively, the communications application may be used to establish voice calling, video calling, or both between users of the application.

At 320, a user account for using the communications application may be created at mobile device 302—e.g., a first time a user opens the communications application. Creating a user account may include obtaining a username and password from the user along with other details of the user, including a name, phone number, address, etc.

At 325, a remote device may be registered with a user account. That is, a user may add one or more remote devices to a list of available devices for mobile device 302. In some examples, a remote device may have (e.g., be pre-programmed with or be assigned during registration) a unique identifier so that the communications application is able to identify the remote device if other users attempt to add the remote device.

In some examples, during registration, remote device 301 may display (e.g., at a dashboard display) a pin in response to receiving a registration request. Mobile device 302 may receive the pin (e.g., as a user input) before completing registration of remote device 301. In some examples, an account of the first user to register remote device 301 may be designated as an administrative account with respect to remote device 301. In such cases, the account of the first user may be authorized to create rules that dictate how other mobile devices interface with remote device 301. In some examples, mobile device 302 may receive input that prevents other user accounts from registering with remote device 301. In some examples, mobile device 302 may receive input that indicates a subset of the imaging devices at remote device 301 that are accessible to other user accounts that register with remote device 301. In some examples, mobile device 302 may receive input that grants any nearby mobile devices (e.g., guest accounts) that discover a presence of remote device 301 access to a subset of the imaging devices at remote device 301 (e.g., the external cameras of remote device 301).

At 330, mobile device 302 may identify a set of imaging devices at remote device 301 that are available for mobile device 302 to access. For example, mobile device 302 may identify one or more available imaging devices at remote device 301. In some examples, mobile device 302 selects a subset of the one or more available imaging devices to obtain access to visual data captured by the selected subset of imaging devices.

At 335, remote device 301 may buffer visual data captured by the one or more imaging devices configured at remote device 301. In some examples, remote device 301 begins buffering the visual data when remote device 301 is powered on. Alternatively, remote device 301 may buffer the visual data after establishing a connection with mobile device 302. Alternatively, remote device 301 may buffer the visual data after establishing a connection with mobile device 302 and being registered with a user account.

At 340, mobile device 302 may receive a visual data set from remote device 301. The visual data set may include visual data captured from the one or more imaging devices at remote device 301. For example, the visual data set may include a first set of visual data captured by a first imaging device and a second set of visual data captured by a second imaging device. The visual data set may include buffered visual data, live visual data (e.g., a photo or video stream), or both. in some examples, mobile device 302 received visual data from the one or more imaging devices identified by mobile device at 330.

At 345, mobile device 302 may buffer the visual data received from remote device 301. For example, mobile device 302 may buffer visual data received within a duration (e.g., within a last hour).

At 350, mobile device 302 may select one or more of the imaging devices of remote device 301 to make available to other communications devices—e.g., before making a call. In some examples, mobile device 302 selects the imaging devices after identifying the available imaging devices at remote device 301. The imaging devices selected by mobile device 302 may be the same as or different than the imaging devices selected at 330 for access by mobile device 302.

At 355, mobile device 302 may establish a connection with communications device 304 via the communications application. Mobile device 302 may establish a voice call with communications device 304. Or mobile device 302 may establish a video call with communications device 304. The connection may be established via an access network (e.g., a cellular or satellite network), a data network (e.g., the Internet), or both.

At 360, communication data may be exchanged between mobile device 302 and communications device 304 via the communications application. The communication data may include voice packets, video packets, photos, text messages, or any combination thereof. In some examples, the video packets and photos correspond to video captured by imaging devices at mobile device 302.

At 365, mobile device 302 may receive, as part of data signaled for the communications application, an inquiry message from communications device 304 requesting an indication of available cameras at mobile device 302.

At 370, mobile device 302 may transmit, as part of data signaled for the communications application, a response message responding to the inquiry message received from communications device 304. The response message may include an indication of one or more imaging devices available at mobile device 302. The one or more available imaging devices may include one or more of the imaging devices at mobile device 302 and one or more of the imaging devices at remote device 301.

At 375, mobile device 302 may receive a selection of one or more of the available imaging devices. For example, mobile device 302 may select one or more of the imaging devices at remote device 301 that are accessible to mobile device 302.

At 380, mobile device 302 may select one or more imaging devices of remote device 301 that are accessible to mobile device 302. In some examples, mobile device 302 may select the one or more imaging devices based on receiving, from a user of mobile device 302, a selection of the one or more imaging devices. In other examples, mobile device may select the one or more imaging devices based on receiving, from communications device 304, a selection of the one or more imaging devices.

At 385, mobile device 302 may transmit a first set of visual data to communications device 304. The first set of visual data may include data captured by the one or more imaging devices selected at 380. In some examples, the first set of visual data includes first visual data captured by an imaging device at remote device 301. The first set of visual data may also include second visual data captured by a second imaging device at remote device 301 or by an imaging device at mobile device 302.

At 390, may select, for a second time, one or more imaging devices of remote device 301 that are accessible to mobile device 302, where the one or more imaging devices may be different than the one or more imaging devices selected at 380. In some examples, mobile device 302 may select the one or more imaging devices based on receiving, from a user of mobile device 302, a second selection of the one or more imaging devices. In other examples, mobile device may select the one or more imaging devices based on receiving, from communications device 304, a second selection of the one or more imaging devices.

At 395, mobile device 302 may transmit a second set of visual data to communications device 304.

In some examples, mobile device 302 may use an established connection with remote device 301 to monitor the use of remote device 301. In such examples, mobile device 302 may establish a communication link using a long-range wireless communication technology (e.g., a cellular technology). Mobile device 302 may use the communications application to remotely access one or more imaging devices at remote device 301 (e.g., an internal or external imaging device).

Figure 4:
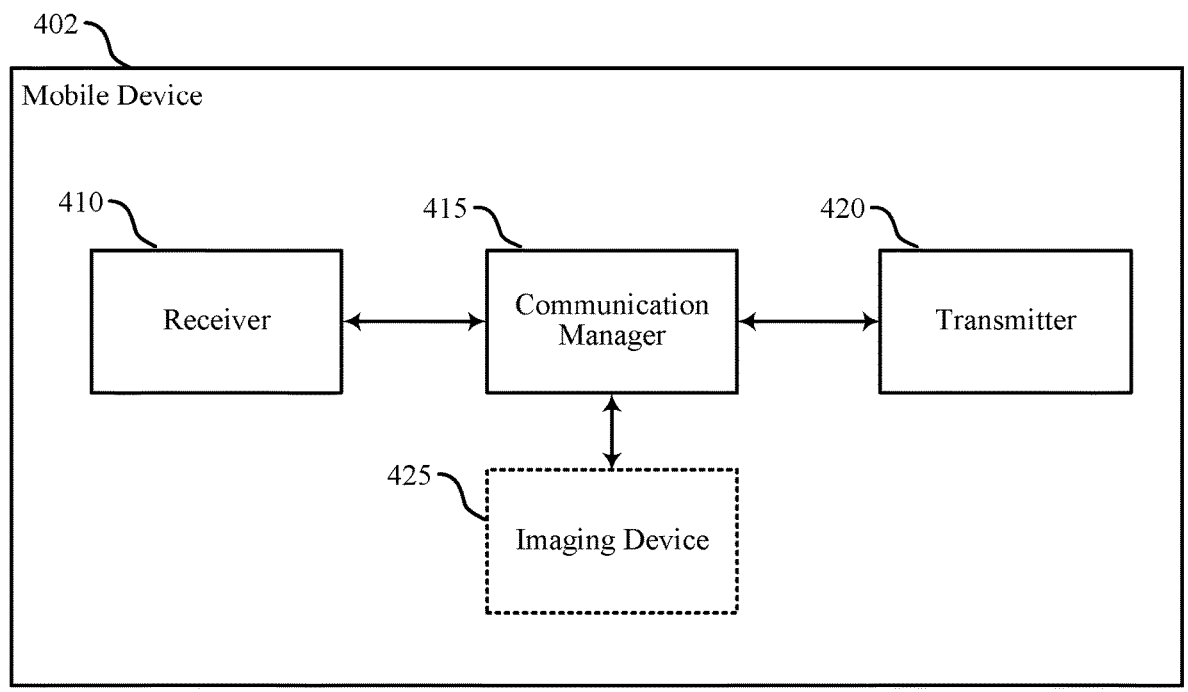
FIG. 4 shows a block diagram of a mobile device that supports sharing externally captured content in communications in accordance with examples as disclosed herein.

FIG. 4 shows a block diagram 400 of a mobile device that supports sharing externally captured content in communications in accordance with aspects of the present disclosure. Mobile device 402 may be an example of aspects of a mobile device as described herein. Mobile device 402 may include receiver 410, transmitter 415, communications manager 420, and imaging device 425. Mobile device 402 may also include a processor. Each of these components may be in communication with one another (e.g., via one or more buses).

Receiver 410 may provide a means for receiving information such as packets, user data, control information, or any combination thereof. Information may be passed on to other components of mobile device 402. Receiver 410 may utilize a single antenna or a set of multiple antennas.

Transmitter 415 may provide a means for transmitting signals generated by other components of mobile device 402. For example, transmitter 415 may transmit information such as packets, user data, control information, or any combination thereof. In some examples, transmitter 415 may be co-located with receiver 410 in a transceiver. Transmitter 415 may utilize a single antenna or a set of multiple antennas.

Imaging device 425 may provide a means for capturing visual data in a proximity of mobile device 402. Imaging device 425 may include components for capturing visual data and component for capturing audio data. Imaging device 425 may include memory for buffering captured visual data, audio data, or both.

Communications manager 420, receiver 410, transmitter 415, imaging device 425, or various combinations thereof or various components thereof may be examples of means for performing various aspects of sharing externally captured content in communications as described herein. For example, communications manager 420, receiver 410, transmitter 415, or various combinations or components thereof may support a method for performing one or more of the functions described herein.

In some examples, communications manager 420, receiver 410, transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, communications manager 420, receiver 410, transmitter 415, or various combinations or components thereof may be implemented in code (e.g., as communications management software or firmware) executed by a processor. If implemented in code executed by a processor, the functions of communications manager 420, receiver 410, transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, communications manager 420 may be configured to perform various operations (e.g., receiving, monitoring, transmitting) using or otherwise in cooperation with receiver 410, transmitter 415, or both. For example, communications manager 420 may receive information from receiver 410, send information to transmitter 415, or be integrated in combination with receiver 410, transmitter 415, or both to receive information, transmit information, or perform various other operations as described herein. Communications manager 420 may also receive visual data, audio data, or both from imaging device 425, and may include the data received from imaging device into packets communicated using transmitter 415.

Communications manager 420 may support communications at a device in accordance with examples as disclosed herein. For example, communications manager 420 may be configured as or otherwise support a means for establishing, by a mobile device, a first connection with a vehicle that includes a camera. The communications manager 420 may be configured as or otherwise support a means for receiving, at the mobile device from the vehicle, a set of visual data associated with the camera based at least in part on establishing the first connection with the vehicle. The communications manager 420 may be configured as or otherwise support a means for establishing, by an application of the mobile device, a second connection with a device that is remote from the mobile device, the second connection supporting wireless communication between the mobile device and the device. The communications manager 420 may be configured as or otherwise support a means for transmitting, from the mobile device to the device via the application, the set of visual data received from the vehicle based at least in part on establishing the second connection.

Figure 5:
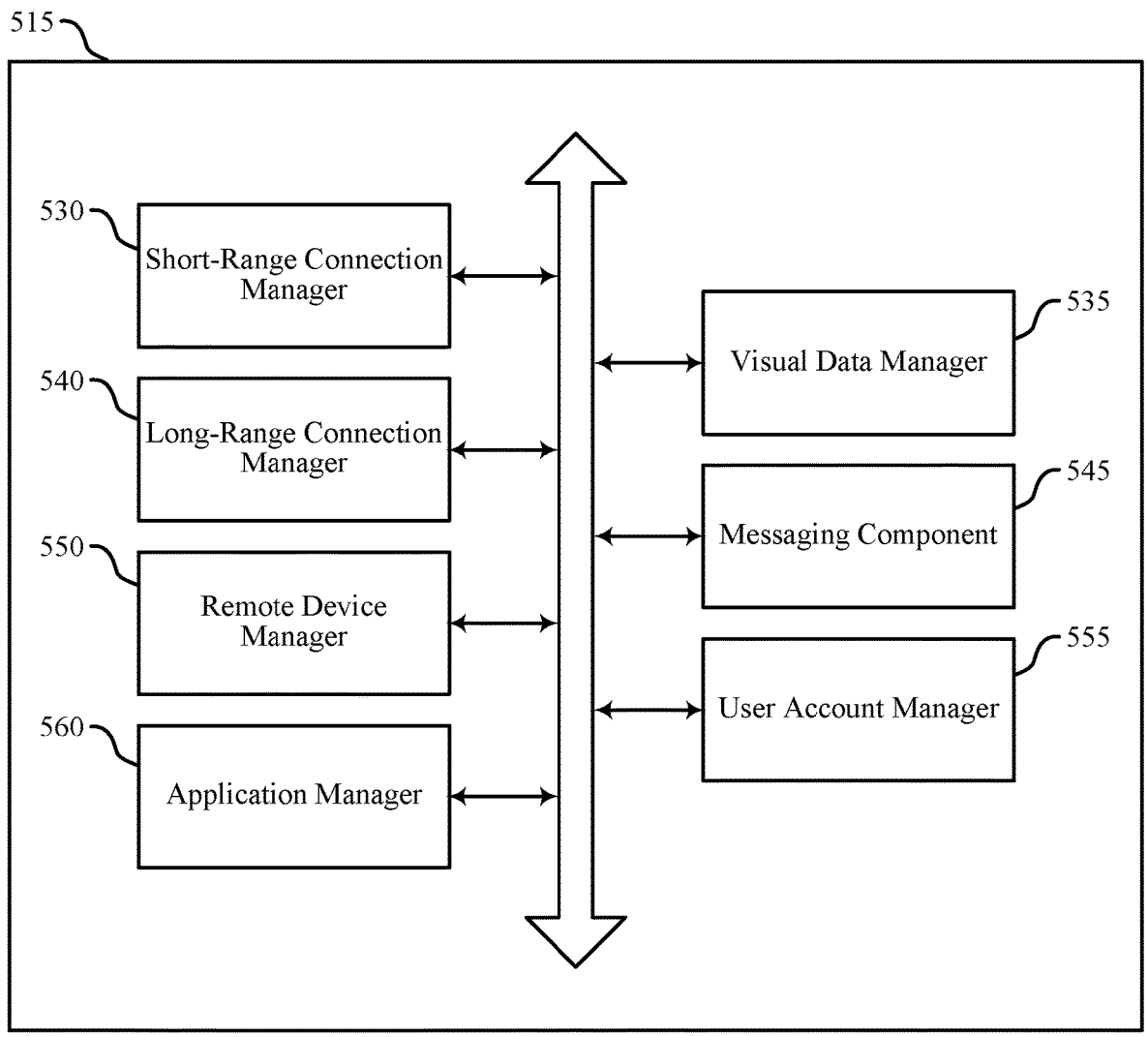
FIG. 5 shows a block diagram of a communications manager that supports sharing externally captured content in communications in accordance with examples as disclosed herein.

FIG. 5 shows a block diagram of a communications manager that supports sharing externally captured content in communications in accordance with aspects of the present disclosure. Communications manager 520 may be an example of aspects of a communications manager 420 of FIG. 4. Communications manager 520, or various components thereof, may be an example of means for performing various aspects of sharing externally captured content in communications as described herein. For example, communications manager 520 may include a short-range connection manager 530, a visual data manager 535, a long-range connection manager 540, a messaging component 545, a remote device manager 550, a user account manager 555, an application manager 560, or any combination thereof. Each of these components may communicate, directly or indirectly, with one another (e.g., via one or more buses).

The short-range connection manager 530 may be configured as or otherwise support a means for establishing, by a mobile device, a first connection with a vehicle that includes a camera. The visual data manager 535 may be configured as or otherwise support a means for receiving, at the mobile device from the vehicle, a set of visual data associated with the camera based at least in part on establishing the first connection with the vehicle. The long-range connection manager 540 may be configured as or otherwise support a means for establishing, by an application of the mobile device, a second connection with a device that is remote from the mobile device, the second connection supporting wireless communication between the mobile device and the device. The messaging component 545 may be configured as or otherwise support a means for transmitting, from the mobile device to the device via the application, the set of visual data received from the vehicle based at least in part on establishing the second connection.

In some examples, the visual data manager 535 may be configured as or otherwise support a means for transmitting, from the mobile device to the vehicle based at least in part on establishing the first connection with the vehicle, an inquiry as to whether the vehicle supports sharing visual data obtained by the vehicle. In some examples, the visual data manager 535 may be configured as or otherwise support a means for receiving, from the vehicle based at least in part on transmitting the inquiry, an indication that the vehicle supports sharing the visual data, where the set of visual data is received at the mobile device based at least in part on receiving the indication.

In some examples, the remote device manager 550 may be configured as or otherwise support a means for associating, by the application during an initial setup procedure, a first identifier of the vehicle with an account of a user of the application. In some examples, the user account manager 555 may be configured as or otherwise support a means for authorizing, based at least in part on completing the initial setup procedure, the account of the user to establish mappings providing other accounts of other users access to respective combinations of cameras installed on the vehicle, the cameras including the camera.

In some examples, the visual data manager 535 may be configured as or otherwise support a means for receiving, at the mobile device based at least in part on activating the application, an indication of a set of cameras installed on the vehicle, the set of cameras including the camera. In some examples, the visual data manager 535 may be configured as or otherwise support a means for receiving, at the mobile device, a selection of the camera from the set of cameras, where the set of visual data of the camera is received at the mobile device from the vehicle based at least in part on selecting the camera.

In some examples, the visual data manager 535 may be configured as or otherwise support a means for receiving, at the mobile device, a second selection of a second camera from the set of cameras. In some examples, the visual data manager 535 may be configured as or otherwise support a means for receiving, at the mobile device from the vehicle, a second set of visual data associated with the second camera based at least in part on selecting the second camera. In some examples, the messaging component 545 may be configured as or otherwise support a means for transmitting, to the device via the application, the second set of visual data concurrently with or in place of the set of visual data.

In some examples, the user account manager 555 may be configured as or otherwise support a means for determining, by the application, an identity of a user of the mobile device, where the set of cameras indicated to the user are based at least in part on the identity of the user.

In some examples, the visual data manager 535 may be configured as or otherwise support a means for receiving, at the mobile device based at least in part on activating the application, an indication of a set of cameras installed on the vehicle, the set of cameras including the camera. In some examples, the messaging component 545 may be configured as or otherwise support a means for transmitting, from the mobile device to the device based at least in part on establishing the second connection, the indication of the set of cameras via the application. In some examples, the visual data manager 535 may be configured as or otherwise support a means for receiving, from the device, a selection of the camera of the set of cameras, where the set of visual data is transmitted to the device via the application based at least in part on the selection.

In some examples, a plurality of mobile devices may include communications managers similar to the communications manager 515. In such cases, short-range connection managers (similar to the short range connection manager 530) at each of the plurality of mobile devices may be configured as or otherwise support a means for establishing respective connections with the vehicle, each mobile device of the plurality of mobile devices running a respective instance of the application, where the plurality of mobile devices includes the mobile device that include communications manager 515. Also, visual data managers (similar to the visual data manager 535) at each of the plurality of mobile devices may be configured as or otherwise support a means for receiving the set of visual data based at least in part on establishing the respective connections with the vehicle. Also, messaging components (similar to the messaging component 545) at each of the plurality of mobile devices may be configured as or otherwise support a means for transmitting to a respective device of a plurality of devices, the set of visual data via the respective instance of the application, where the plurality of devices includes the device.

In some examples, the visual data manager 535 may be configured as or otherwise support a means for receiving, at the plurality of mobile devices based at least in part on establishing the respective connection, an indication of a set of cameras installed on the vehicle, the set of cameras including the camera.

In some examples, the messaging component 545 may be configured as or otherwise support a means for transmitting, from the mobile device to the device based at least in part on establishing the second connection, a second set of visual data via the application, the second set of visual data being captured by the camera of the mobile device, where the set of visual data of the vehicle is transmitted to the device in place of or concurrently with the second set of visual data.

In some examples, the application supports text communications, voice communications, video communications, or any combination thereof. In some examples, the first connection with the vehicle is established based at least in part on activating the application.

In some examples, the application manager 560 may be configured as or otherwise support a means for activating, at the mobile device, the application that supports wireless communications with other devices, where establishing the first connection with the vehicle is based at least in part on activating the application.

Figure 6:
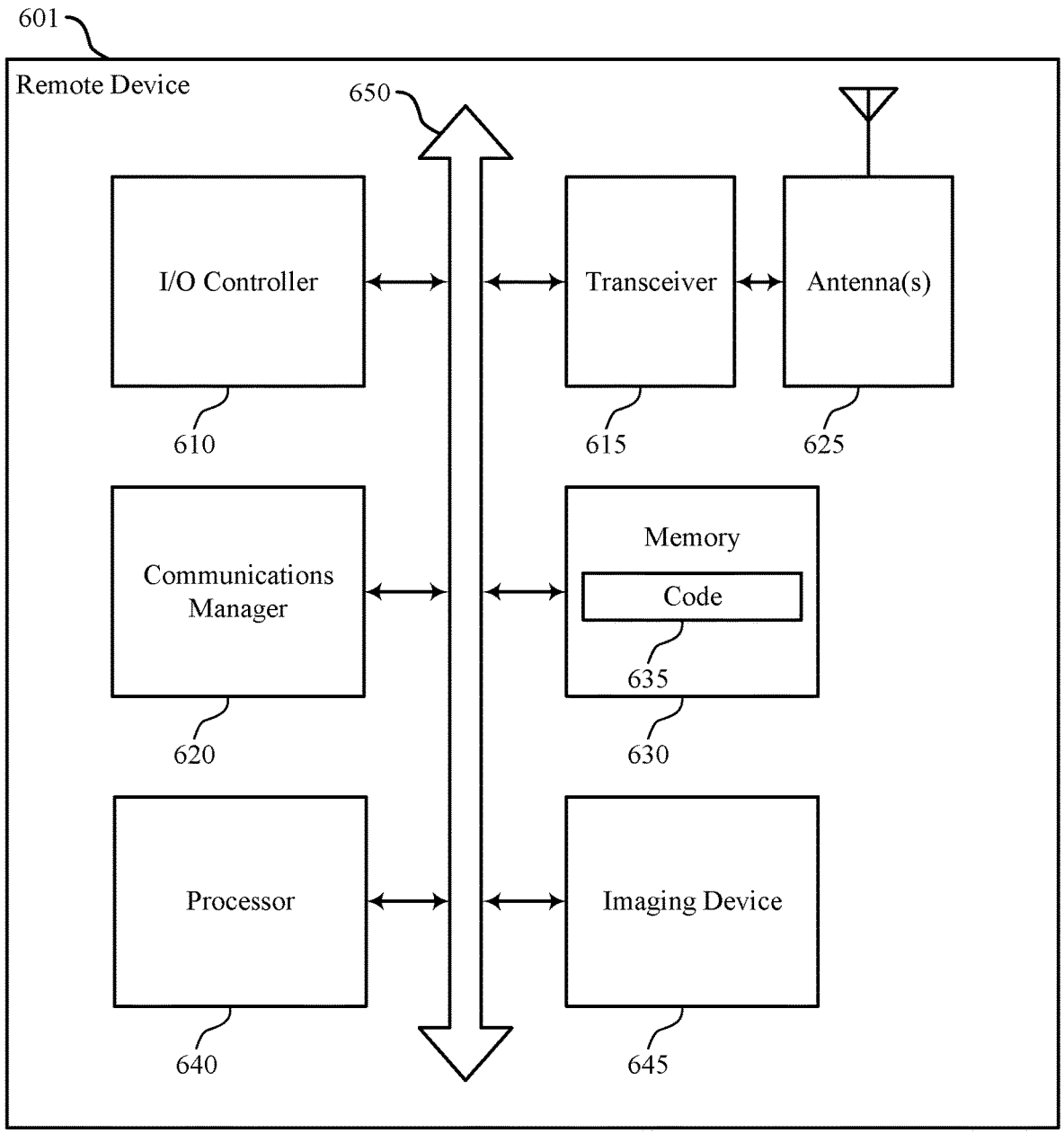
FIG. 6 shows a block diagram of a remote device that supports sharing externally captured content in communications in accordance with examples as disclosed herein.

FIG. 6 shows a block diagram of a remote device that supports sharing externally captured content in communications in accordance with aspects of the present disclosure. Remote device 601 may be an example of or include the components of a remote device as described herein. Remote device 601 may communicate with other devices (e.g., mobile devices) wirelessly or via a wired connection. Remote device 601 may include components for bi-directional data communications including components for transmitting and receiving communications, such as I/O controller 610, transceiver 615, communications manager 620, one or more antennas 625, memory 630, code 635, processor 640, and imaging device 645. These components may be in electronic communication or otherwise coupled (e.g., operatively, communicatively, functionally, electronically, electrically) via one or more buses (e.g., a bus 650).

I/O controller 610 may manage input and output signals for the remote device 601. I/O controller 610 may also manage peripherals not integrated into the remote device 601. In some cases, I/O controller 610 may represent a physical connection or port to an external peripheral. In some cases, I/O controller 610 may utilize an operating system such as iOS®, ANDROID®, MS-DOS®, MS-WINDOWS®, OS/2®, UNIX®, LINUX®, or another known operating system. Additionally, or alternatively, I/O controller 610 may represent or interact with a modem, a keyboard, a mouse, a touchscreen, or a similar device. In some cases, I/O controller 610 may be implemented as part of a processor, such as processor 640. In some cases, a user may interact with remote device 601 via I/O controller 610 or via hardware components controlled by I/O controller 610.

In some cases, remote device 601 may include one or more antennas 625, which may be capable of concurrently transmitting or receiving multiple wireless transmissions. Transceiver 615 may communicate bi-directionally, via the one or more antennas 625, wired, or wireless links as described herein. In some examples, the one or more antennas 625 support short-range communications (e.g., with a mobile device), long-range communications (via a network), or both.

For example, transceiver 615 may represent a wireless transceiver and may communicate bi-directionally with another wireless transceiver. Transceiver 615 may also include a modem to modulate the packets, to provide the modulated packets to the one or more antennas 625 for transmission, and to demodulate packets received from the one or more antennas 625. Transceiver 615, or transceiver 615 and the one or more antennas 625, may be an example of a transmitter, receiver, or any combination thereof or component thereof, as described herein.

Memory 630 may include random access memory (RAM) and read-only memory (ROM). Code 635 may be stored by memory 630. Code 635 may be computer-readable and computer-executable and include instructions that, when executed by processor 640, cause remote device 601 to perform various functions described herein. Code 635 may be stored in a non-transitory, computer-readable medium such as system memory or another type of memory. In some cases, code 635 may not be directly executable by processor 640 but may cause a computer (e.g., when compiled and executed) to perform functions described herein. In some cases, memory 630 may contain, among other things, a basic input/output system (BIOS) which may control basic hardware or software operation such as the interaction with peripheral components or devices.

Processor 640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 640 may be configured to operate a memory array using a memory controller. In some other cases, a memory controller may be integrated into processor 640. Processor 640 may be configured to execute computer-readable instructions stored in a memory (e.g., memory 630) to cause remote device 601 to perform various functions (e.g., functions or tasks supporting sharing externally captured content in communications). For example, remote device 601 or a component of remote device 601 may include processor 640 and memory 630 coupled to processor 640, processor 640 and memory 630 configured to perform various functions described herein.

Imaging device 645 may be configured to capture visual data, audio data, or both in a proximity of remote device 601. Data captured by imaging device 645 may be stored at memory 630.

Communications manager 620 may be configured to manage communications (e.g., control and data communications) between remote device 601 and an access network. Communications manager 620 may also be configured to manage communications between remote device 601 and another device via a wireless or wired link. Communications manager 620 may also be configured to manage aspects of communications between devices (e.g., a mobile device and a communications device) that occur via a communications application. For example, communications manager 620 may be configured to handle requests from mobile devices for a set of available cameras at remote device 601. Communications manager 620 may also be configured to transmit visual data, audio data, or both to a mobile device.

Communications manager 620 may be configured as or otherwise support a means for establishing short-range connections with a mobile device, long-range connections with a network, or both. Communications manager 620 may also be configured as or otherwise support a means for establishing a connection with a mobile device in accordance with protocol associated with advertising a set of available imaging devices at remote device 601 and providing visual data to a mobile device.

In some examples, communications manager 620 may be configured to perform various operations (e.g., receiving, monitoring, transmitting) using or otherwise in cooperation with transceiver 615, the one or more antennas 625, or any combination thereof. Although communications manager 620 is illustrated as a separate component, in some examples, one or more functions described with reference to communications manager 620 may be supported by or performed by processor 640, memory 630, code 635, or any combination thereof. For example, code 635 may include instructions executable by processor 640 to cause remote device 601 to perform various aspects of sharing externally captured content in communications as described herein, or processor 640 and memory 630 may be otherwise configured to perform or support such operations.

Figure 7:
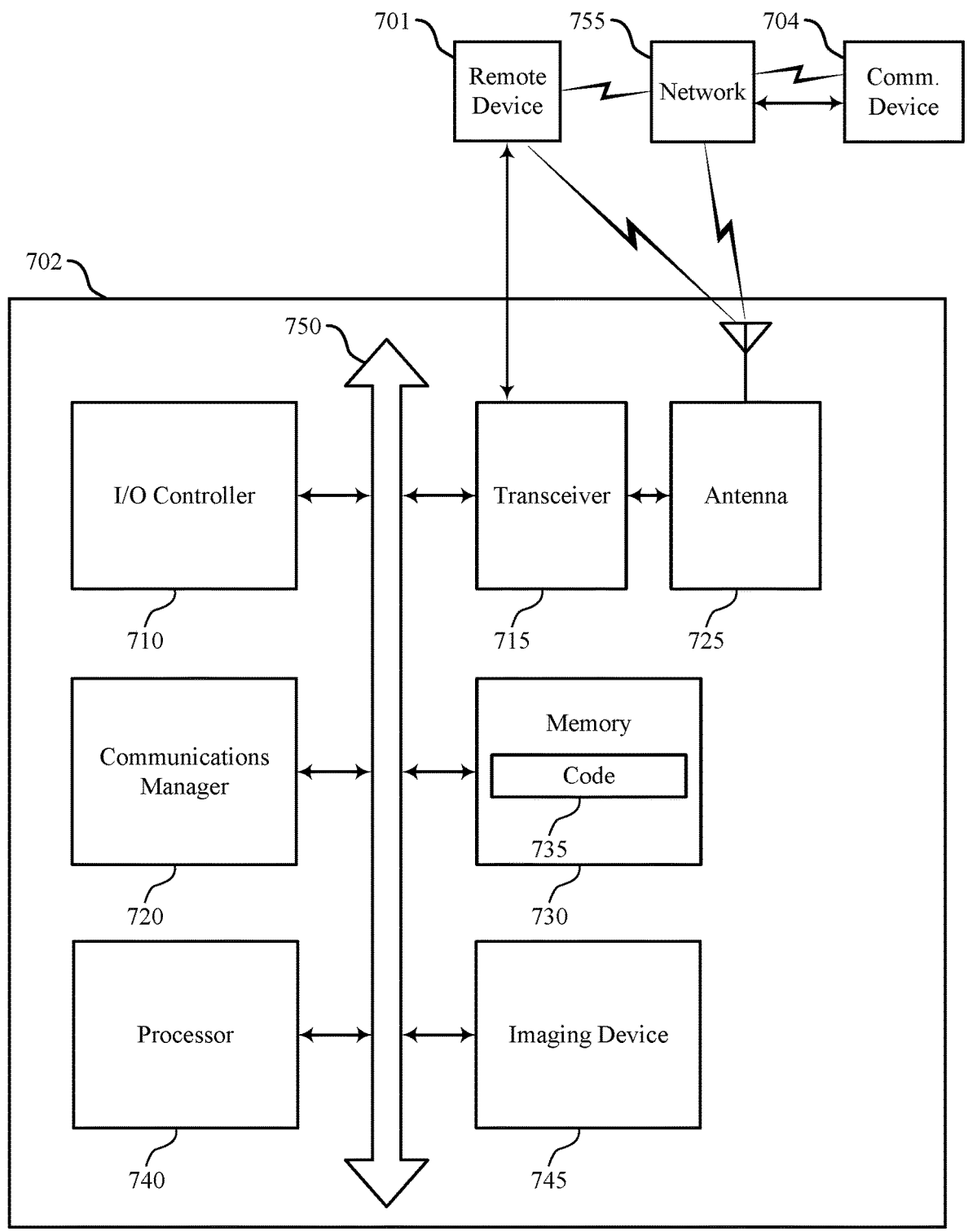
FIG. 7 shows a block diagram of a system that includes a mobile device, a remote device, and a communications device that support sharing externally captured content in communications in accordance with examples as disclosed herein.

FIG. 7 shows a block diagram of a system that includes a mobile device, a remote device, and a communications device that support sharing externally captured content in communications in accordance with examples as disclosed herein. System 700 may include mobile device 702, remote device 701, network 755, and communications device 704.

Mobile device 702 may be an example of or include the components of a mobile device as described herein. Mobile device 702 may communicate with other devices (e.g., remote devices or communications devices) wirelessly or via a wired connection. For example, mobile device 702 may communicate with remote device 701 via a wireless of wired connection, where remote device 701 may be an example of a remote device described herein. Mobile device 702 may also communicate with network 755 via a wireless connection, where network 755 may be an example of a network described herein. Network 755 may include an access network (e.g., a cellular or satellite access network) and data network.

Mobile device 702 may include components for bi-directional data communications including components for transmitting and receiving communications, such as I/O controller 710, transceiver 715, communications manager 720, one or more antennas 725, memory 730, code 735, processor 740, and imaging device 745. These components may be in electronic communication or otherwise coupled (e.g., operatively, communicatively, functionally, electronically, electrically) via one or more buses (e.g., a bus 750).

I/O controller 710 may manage input and output signals for the mobile device 702. I/O controller 710 may also manage peripherals not integrated into the mobile device 702. In some cases, I/O controller 710 may represent a physical connection or port to an external peripheral. In some cases, I/O controller 710 may utilize an operating system such as iOS®, ANDROID®, MS-DOS®, MS-WINDOWS®, OS/2®, UNIX®, LINUX®, or another known operating system. Additionally, or alternatively, I/O controller 710 may represent or interact with a modem, a keyboard, a mouse, a touchscreen, or a similar device. In some cases, I/O controller 710 may be implemented as part of a processor, such as processor 740. In some cases, a user may interact with mobile device 702 via I/O controller 710 or via hardware components controlled by I/O controller 710.

In some cases, mobile device 702 may include one or more antennas 725, which may be capable of concurrently transmitting or receiving multiple wireless transmissions. The one or more antennas 725 may be used to support both short-range communications (e.g., using Bluetooth) and long-range communications (e.g., using cellular or satellite technology).

Transceiver 715 may communicate bi-directionally, via the one or more antennas 725, wired, or wireless links as described herein. For example, transceiver 715 may represent a wireless transceiver and may communicate bi-directionally with another wireless transceiver. In some examples, transceiver 715 may communicate with remote device 701 via a wired link or via a wireless link via the one or more antennas 725 and may communicate with network 755 via a wireless link. Transceiver 715 may also include a modem to modulate the packets, to provide the modulated packets to the one or more antennas 725 for transmission, and to demodulate packets received from the one or more antennas 725. Transceiver 715, or transceiver 715 and the one or more antennas 725, may be an example of a transmitter, receiver, or any combination thereof or component thereof, as described herein.

Memory 730 may include RAM and ROM. Code 735 may be stored by memory 730. Code 735 may be computer-readable and computer-executable and include instructions that, when executed by processor 740, cause mobile device 702 to perform various functions described herein. Code 735 may be stored in a non-transitory, computer-readable medium such as system memory or another type of memory. In some cases, code 735 may not be directly executable by processor 740 but may cause a computer (e.g., when compiled and executed) to perform functions described herein. In some cases, memory 730 may contain, among other things, a BIOS which may control basic hardware or software operation such as the interaction with peripheral components or devices.

Processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 740 may be configured to operate a memory array using a memory controller. In some other cases, a memory controller may be integrated into processor 740. Processor 740 may be configured to execute computer-readable instructions stored in a memory (e.g., memory 730) to cause mobile device 702 to perform various functions (e.g., functions or tasks supporting sharing externally captured content in communications). For example, mobile device 702 or a component of mobile device 702 may include processor 740 and memory 730 coupled to processor 740, processor 740 and memory 730 configured to perform various functions described herein.

Imaging device 745 may be configured to capture visual data, audio data, or both in a proximity of mobile device 702. Data captured by imaging device 745 may be stored at memory 730.

Communications manager 720 may be configured to manage communications (e.g., control and data communications) between mobile device 702 and an access network. Communications manager 620 may also be configured to manage communications between remote device 601 and another device via a wireless or wired link. Communications manager 720 may also be configured to manage aspects of communications between devices (e.g., remote device 701 and communications device 704) that occur via a communications application. For example, communications manager 720 may be configured to handle requests from communications device 704 for a set of available/accessible cameras at mobile device 702. Communications manager 720 may also be configured to receive visual data, audio data, or both from remote device 701, and may be further configured to store the received data, relay the received data, or both.

Communications manager 720 may be configured as or otherwise support a means for establishing, by a mobile device, a first connection with a vehicle that includes a camera. The communications manager 620 may be configured as or otherwise support a means for receiving, at the mobile device from the vehicle, a set of visual data associated with the camera based at least in part on establishing the first connection with the vehicle. The communications manager 620 may be configured as or otherwise support a means for establishing, by an application of the mobile device, a second connection with a device that is remote from the mobile device, the second connection supporting wireless communication between the mobile device and the device. The communications manager 620 may be configured as or otherwise support a means for transmitting, from the mobile device to the device via the application, the set of visual data received from the vehicle based at least in part on establishing the second connection.

In some examples, communications manager 720 may be configured to perform various operations (e.g., receiving, monitoring, transmitting) using or otherwise in cooperation with transceiver 715, the one or more antennas 725, or any combination thereof. Although communications manager 720 is illustrated as a separate component, in some examples, one or more functions described with reference to communications manager 720 may be supported by or performed by processor 740, memory 730, code 735, or any combination thereof. For example, code 735 may include instructions executable by processor 740 to cause mobile device 702 to perform various aspects of sharing externally captured content in communications as described herein, or processor 740 and memory 730 may be otherwise configured to perform or support such operations.

Figure 8:
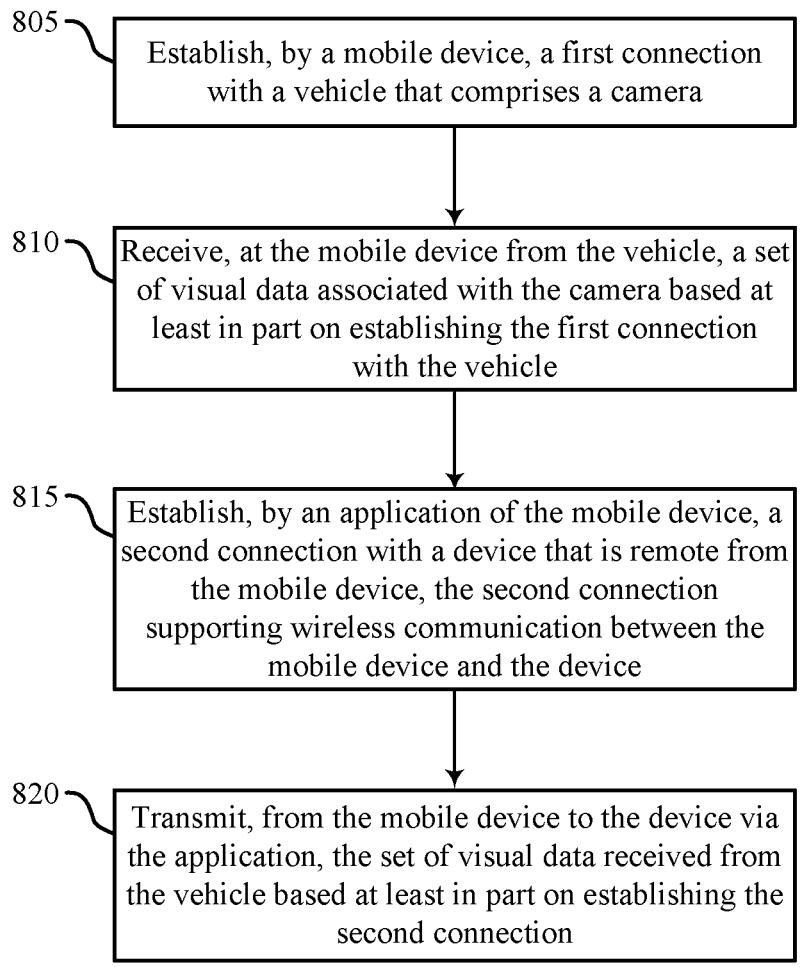
FIG. 8 shows an example set of operations that supports sharing externally captured content in accordance with examples as described herein.

FIG. 8 shows an example set of operations that supports sharing externally captured content in accordance with examples as described herein. The operations of method 800 may be implemented by a mobile device or its components as described herein. For example, the operations of method 800 may be performed by a mobile device as described with reference to FIGS. 1 through 5 and 7. In some examples, a mobile device may execute a set of instructions to control the functional elements of the mobile device to perform the described functions. Additionally, or alternatively, the mobile device may perform aspects of the described functions using special-purpose hardware.

At 805, the method may include establishing, by a mobile device, a first connection with a vehicle that includes a camera. The operations of 805 may be performed in accordance with examples as disclosed herein. In some examples, aspects of the operations of 805 may be performed by a short-range connection manager 530 as described with reference to FIG. 5.

At 810, the method may include receiving, at the mobile device from the vehicle, a set of visual data associated with the camera based at least in part on establishing the first connection with the vehicle. The operations of 810 may be performed in accordance with examples as disclosed herein. In some examples, aspects of the operations of 810 may be performed by a visual data manager 535 as described with reference to FIG. 5.

At 815, the method may include establishing, by an application of the mobile device, a second connection with a device that is remote from the mobile device, the second connection supporting wireless communication between the mobile device and the device. The operations of 815 may be performed in accordance with examples as disclosed herein. In some examples, aspects of the operations of 815 may be performed by a long-range connection manager 540 as described with reference to FIG. 5.

At 820, the method may include transmitting, from the mobile device to the device via the application, the set of visual data received from the vehicle based at least in part on establishing the second connection. The operations of 820 may be performed in accordance with examples as disclosed herein. In some examples, aspects of the operations of 820 may be performed by a messaging component 545 as described with reference to FIG. 5.

In some examples, an apparatus as described herein may perform a method or methods, such as the method 800. The apparatus may include, features, circuitry, logic, means, or instructions (e.g., a non-transitory, computer-readable medium storing instructions executable by a processor), or any combination thereof for performing the following aspects of the present disclosure:

Aspect 1: The method or apparatus, including operations features, circuitry, logic, means, or instructions, or any combination thereof for establishing, by a mobile device, a first connection with a vehicle that includes a camera; receiving, at the mobile device from the vehicle, a set of visual data associated with the camera based at least in part on establishing the first connection with the vehicle; establishing, by an application of the mobile device, a second connection with a device that is remote from the mobile device, the second connection supporting wireless communication between the mobile device and the device; and transmitting, from the mobile device to the device via the application, the set of visual data received from the vehicle based at least in part on establishing the second connection.

Aspect 2: The method or apparatus of aspect 1, further including operations, features, circuitry, logic, means, or instructions, or any combination thereof for transmitting, from the mobile device to the vehicle based at least in part on establishing the first connection with the vehicle, an inquiry as to whether the vehicle supports sharing visual data obtained by the vehicle and receiving, from the vehicle based at least in part on transmitting the inquiry, an indication that the vehicle supports sharing the visual data, where the set of visual data is received at the mobile device based at least in part on receiving the indication.

Aspect 3: The method or apparatus of any of aspects 1 through 2, further including operations, features, circuitry, logic, means, or instructions, or any combination thereof for associating, by the application during an initial setup procedure, a first identifier of the vehicle with an account of a user of the application and authorizing, based at least in part on completing the initial setup procedure, the account of the user to establish mappings providing other accounts of other users access to respective combinations of cameras installed on the vehicle, the cameras including the camera.

Aspect 4: The method or apparatus of any of aspects 1 through 3, further including operations, features, circuitry, logic, means, or instructions, or any combination thereof for receiving, at the mobile device based at least in part on activating the application, an indication of a set of cameras installed on the vehicle, the set of cameras including the camera and receiving, at the mobile device, a selection of the camera from the set of cameras, where the set of visual data of the camera is received at the mobile device from the vehicle based at least in part on selecting the camera.

Aspect 5: The method or apparatus of aspect 4, further including operations, features, circuitry, logic, means, or instructions, or any combination thereof for receiving, at the mobile device, a second selection of a second camera from the set of cameras; receiving, at the mobile device from the vehicle, a second set of visual data associated with the second camera based at least in part on selecting the second camera; and transmitting, to the device via the application, the second set of visual data concurrently with or in place of the set of visual data.

Aspect 6: The method or apparatus of any of aspects 4 through 5, further including operations, features, circuitry, logic, means, or instructions, or any combination thereof for determining, by the application, an identity of a user of the mobile device, where the set of cameras indicated to the user are based at least in part on the identity of the user.

Aspect 7: The method or apparatus of any of aspects 1 through 6, further including operations, features, circuitry, logic, means, or instructions, or any combination thereof for receiving, at the mobile device based at least in part on activating the application, an indication of a set of cameras installed on the vehicle, the set of cameras including the camera; transmitting, from the mobile device to the device based at least in part on establishing the second connection, the indication of the set of cameras via the application; and receiving, from the device, a selection of the camera of the set of cameras, where the set of visual data is transmitted to the device via the application based at least in part on the selection.

Aspect 8: The method or apparatus of any of aspects 1 through 7, further including operations, features, circuitry, logic, means, or instructions, or any combination thereof for establishing, by a plurality of mobile devices, respective connections with the vehicle, each mobile device of the plurality of mobile devices running a respective instance of the application, where the plurality of mobile devices includes the mobile device; receiving, at the plurality of mobile devices from the vehicle, the set of visual data based at least in part on establishing the respective connections with the vehicle; and transmitting, from each mobile device the plurality of mobile devices to a respective device of a plurality of devices, the set of visual data via the respective instance of the application, where the plurality of devices includes the device.

Aspect 9: The method or apparatus of aspect 8, further including operations, features, circuitry, logic, means, or instructions, or any combination thereof for receiving, at the plurality of mobile devices based at least in part on establishing the respective connection, an indication of a set of cameras installed on the vehicle, the set of cameras including the camera.

Aspect 10: The method or apparatus of any of aspects 1 through 9, further including operations, features, circuitry, logic, means, or instructions, or any combination thereof for transmitting, from the mobile device to the device based at least in part on establishing the second connection, a second set of visual data via the application, the second set of visual data being captured by the camera of the mobile device, where the set of visual data of the vehicle is transmitted to the device in place of or concurrently with the second set of visual data.

Aspect 11: The method or apparatus of any of aspects 1 through 10, further including operations, features, circuitry, logic, means, or instructions, or any combination thereof for the application supports text communications, voice communications, video communications, or any combination thereof.

Aspect 12: The method or apparatus of any of aspects 1 through 11, further including operations, features, circuitry, logic, means, or instructions, or any combination thereof for the first connection with the vehicle is established based at least in part on activating the application.

Aspect 13: The method or apparatus of any of aspects 1 through 12, further including operations, features, circuitry, logic, means, or instructions, or any combination thereof for activating, at the mobile device, the application that supports wireless communications with other devices, where establishing the first connection with the vehicle is based at least in part on activating the application.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: a processor; memory coupled with the processor; and instructions stored in the memory and executable by the processor to cause the apparatus to: establish, by a mobile device, a first connection with a vehicle that includes a camera; receive, at the mobile device from the vehicle, a set of visual data associated with the camera based at least in part on establishing the first connection with the vehicle; establish, by an application of the mobile device, a second connection with a device that is remote from the mobile device, the second connection supporting wireless communication between the mobile device and the device; and transmit, from the mobile device to the device via the application, the set of visual data received from the vehicle based at least in part on establishing the second connection.

Aspect 15: The apparatus of aspect 14, where the instructions are further executable by the processor to: transmit, from the mobile device to the vehicle based at least in part on establishing the first connection with the vehicle, an inquiry as to whether the vehicle supports sharing visual data obtained by the vehicle; and receive, from the vehicle based at least in part on transmitting the inquiry, an indication that the vehicle supports sharing the visual data, where the set of visual data is received at the mobile device based at least in part on receiving the indication.

Aspect 16: The apparatus of any of aspects 14 through 15, where the instructions are further executable by the processor to: associate, by the application during an initial setup procedure, a first identifier of the vehicle with an account of a user of the application; and authorize, based at least in part on completing the initial setup procedure, the account of the user to establish mappings providing other accounts of other users access to respective combinations of cameras installed on the vehicle, the cameras including the camera.

Aspect 17: The apparatus of any of aspects 14 through 16, where the instructions are further executable by the processor to: receive, at the mobile device based at least in part on activating the application, an indication of a set of cameras installed on the vehicle, the set of cameras including the camera; and receive, at the mobile device, a selection of the camera from the set of cameras, where the set of visual data of the camera is received at the mobile device from the vehicle based at least in part on selecting the camera.

Aspect 18: The apparatus of any of aspects 14 through 17, where the instructions are further executable by the processor to: receive, at the mobile device based at least in part on activating the application, an indication of a set of cameras installed on the vehicle, the set of cameras including the camera; transmit, from the mobile device to the device based at least in part on establishing the second connection, the indication of the set of cameras via the application; and receive, from the device, a selection of the camera of the set of cameras, where the set of visual data is transmitted to the device via the application based at least in part on the selection.

Aspect 19: The apparatus of any of aspects 14 through 18, where the instructions are further executable by the processor to: establish, by a plurality of mobile devices, respective connections with the vehicle, each mobile device of the plurality of mobile devices running a respective instance of the application, where the plurality of mobile devices includes the mobile device; receive, at the plurality of mobile devices from the vehicle, the set of visual data based at least in part on establishing the respective connections with the vehicle; and transmit, from each mobile device the plurality of mobile devices to a respective device of a plurality of devices, the set of visual data via the respective instance of the application, where the plurality of devices includes the device.

A non-transitory, computer-readable medium is described. The following provides an overview of aspects of the non-transitory, computer-readable medium as described herein:

Aspect 20: A non-transitory, computer-readable medium storing code for wireless communication at a second device, the code including instructions executable by a processor to: establish, by a mobile device, a first connection with a vehicle that includes a camera; receive, at the mobile device from the vehicle, a set of visual data associated with the camera based at least in part on establishing the first connection with the vehicle; establish, by an application of the mobile device, a second connection with a device that is remote from the mobile device, the second connection supporting wireless communication between the mobile device and the device; and transmit, from the mobile device to the device via the application, the set of visual data received from the vehicle based at least in part on establishing the second connection.

Aspect 21: The non-transitory, computer-readable medium of aspect 20, where the code is further executable by the processor to: transmit, from the mobile device to the vehicle based at least in part on establishing the first connection with the vehicle, an inquiry as to whether the vehicle supports sharing visual data obtained by the vehicle; and receive, from the vehicle based at least in part on transmitting the inquiry, an indication that the vehicle supports sharing the visual data, where the set of visual data is received at the mobile device based at least in part on receiving the indication.

Aspect 22: The non-transitory, computer-readable medium of any of aspects 20 through 21, where the code is further executable by the processor to: associate, by the application during an initial setup procedure, a first identifier of the vehicle with an account of a user of the application; and authorize, based at least in part on completing the initial setup procedure, the account of the user to establish mappings providing other accounts of other users access to respective combinations of cameras installed on the vehicle, the cameras including the camera.

Aspect 23: The non-transitory, computer-readable medium of any of aspects 20 through 22, where the code is further executable by the processor to: receive, at the mobile device based at least in part on activating the application, an indication of a set of cameras installed on the vehicle, the set of cameras including the camera; and receive, at the mobile device, a selection of the camera from the set of cameras, where the set of visual data of the camera is received at the mobile device from the vehicle based at least in part on selecting the camera.

Aspect 24: The non-transitory, computer-readable medium of any of aspects 20 through 23, where the code is further executable by the processor to: receive, at the mobile device based at least in part on activating the application, an indication of a set of cameras installed on the vehicle, the set of cameras including the camera; transmit, from the mobile device to the device based at least in part on establishing the second connection, the indication of the set of cameras via the application; and receive, from the device, a selection of the camera of the set of cameras, where the set of visual data is transmitted to the device via the application based at least in part on the selection.

Aspect 25: The non-transitory, computer-readable medium of any of aspects 20 through 24, where the code is further executable by the processor to: establish, by a plurality of mobile devices, respective connections with the vehicle, each mobile device of the plurality of mobile devices running a respective instance of the application, where the plurality of mobile devices includes the mobile device; receive, at the plurality of mobile devices from the vehicle, the set of visual data based at least in part on establishing the respective connections with the vehicle; and transmit, from each mobile device the plurality of mobile devices to a respective device of a plurality of devices, the set of visual data via the respective instance of the application, where the plurality of devices includes the device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a mobile device, comprising:
    establishing, by the mobile device, a connection with a vehicle that comprises a set of cameras, the mobile device being separate from the vehicle;
    activating, via the mobile device, an application installed at the mobile device;
    transmitting, from the mobile device to a communication device different from the mobile device and separate from the vehicle, and via the application installed at the mobile device, an indication of one or more cameras of the set of cameras of the vehicle that are accessible by the mobile device;

receiving, at the mobile device from the communication device via the application installed at the mobile device, a selection of a camera of the indicated one or more cameras of the set of cameras of the vehicle;

receiving, at the mobile device, livestreamed video from the selected camera of the vehicle based at least in part on the received selection from the communication device;

establishing, by the application installed at the mobile device, a communication session between the mobile device and the communication device; and transmitting, from the mobile device to the communication device via the application installed at the mobile device, the livestreamed video from the selected camera of the vehicle based at least in part on establishing the communication session.

2. The method of claim 1, further comprising:

establishing, by a plurality of mobile devices, respective connections with the vehicle, each mobile device of the plurality of mobile devices running a respective instance of the application, wherein the plurality of mobile devices comprises the mobile device;

receiving, at the plurality of mobile devices from the vehicle, the livestreamed video based at least in part on establishing the respective connections with the vehicle; and transmitting, from each mobile device of the plurality of mobile devices to a respective communication device of a plurality of communication devices, the livestreamed video via the respective instance of the application, wherein the plurality of communication devices comprises the communication device.

3. The method of claim 2, further comprising:

receiving, at the plurality of mobile devices based at least in part on establishing the respective connections, an indication of the set of cameras installed on the vehicle, the set of cameras comprising the selected camera.

4. The method of claim 1, further comprising:

transmitting, from the mobile device to the vehicle based at least in part on establishing the connection with the vehicle, an inquiry as to whether the vehicle supports sharing the livestreamed video obtained by the vehicle; and receiving, from the vehicle based at least in part on transmitting the inquiry, an indication that the vehicle supports sharing the livestreamed video, wherein the livestreamed video is received at the mobile device based at least in part on receiving the indication.

5. The method of claim 1, further comprising:

associating, by the application during an initial setup procedure, a first identifier of the vehicle with an account of a user of the application; and authorizing, based at least in part on completing the initial setup procedure, the account of the user to establish mappings providing other accounts of other users access to respective combinations of cameras installed on the vehicle, the cameras comprising the selected camera.

6. The method of claim 1, further comprising:

receiving, at the mobile device, a second selection of a second camera from the set of cameras;

receiving, at the mobile device from the vehicle, a second livestreamed video associated with the second camera based at least in part on the received second selection of the second camera; and transmitting, to the communication device via the application, the second livestreamed video concurrently with or in place of the livestreamed video.

7. The method of claim 1, further comprising:

determining, by the application, an identity of a user of the mobile device, wherein the livestreamed video indicated to the user are based at least in part on the identity of the user.

8. The method of claim 1, further comprising:

transmitting, from the mobile device to the communication device based at least in part on establishing the communication session, a second livestreamed video via the application, the second livestreamed video being captured by a camera of the mobile device, wherein the livestreamed video of the vehicle is transmitted to the communication device in place of or concurrently with the second livestreamed video.

9. The method of claim 1, wherein the application supports text communications, voice communications, video communications, or any combination thereof.

10. The method of claim 1, wherein the connection with the vehicle is established based at least in part on activating the application.

11. The method of claim 1, further comprising:

activating, at the mobile device, the application that supports wireless communications with other devices, wherein establishing the connection with the vehicle is based at least in part on activating the application.

12. A mobile device, comprising:

one or more processors;

one or more memories coupled with the one or more processors; and instructions stored in the one or more memories and executable by the one or more processors to cause the mobile device to:

establish, by the mobile device, a connection with a vehicle that comprises a set of cameras, the mobile device being separate from the vehicle;

activate, via the mobile device, an application installed at the mobile device;

transmit, from the mobile device to a communication device different than the mobile device and separate from the vehicle, and via the application installed at the mobile device, an indication of one or more cameras of the set of cameras of the vehicle that are accessible by the mobile device;

receive, at the mobile device from the communication device via the application installed at the mobile device, a selection of a camera of the indicated one or more cameras of the set of cameras of the vehicle;

receive, at the mobile device, livestreamed video from the selected camera of the vehicle based at least in part on the received selection from the communication device;

establish, by the application installed at the mobile device, a communication session between the mobile device and the communication device; and transmit, from the mobile device to the communication device via the application installed at the mobile device, the livestreamed video from the selected camera of the vehicle based at least in part on establishing the communication session.

13. The mobile device of claim 12, wherein the instructions are further executable by the one or more processors to cause the mobile device to:

transmit, from the mobile device to the vehicle based at least in part on establishing the connection with the vehicle, an inquiry as to whether the vehicle supports sharing the livestreamed video obtained by the vehicle; and receive, from the vehicle based at least in part on transmitting the inquiry, an indication that the vehicle supports sharing the livestreamed video, wherein the livestreamed video is received at the mobile device based at least in part on receiving the indication.

14. The mobile device of claim 12, wherein the instructions are further executable by the one or more processors to cause the mobile device to:

associate, by the application during an initial setup procedure, a first identifier of the vehicle with an account of a user of the application; and authorize, based at least in part on completing the initial setup procedure, the account of the user to establish mappings providing other accounts of other users access to respective combinations of cameras installed on the vehicle, the cameras comprising the selected camera.

15. The mobile device of claim 12, wherein the instructions are further executable by the one or more processors to cause the mobile device to:

receive, at the mobile device based at least in part on activating the application, an indication of the set of cameras of the vehicle.

16. The mobile device of claim 12, wherein the instructions are further executable by the one or more processors to cause the mobile device to:

establish, by a plurality of mobile devices, respective connections with the vehicle, each mobile device of the plurality of mobile devices running a respective instance of the application, wherein the plurality of mobile devices comprises the mobile device;

receive, at the plurality of mobile devices from the vehicle, the livestreamed video based at least in part on establishing the respective connections with the vehicle; and transmit, from each mobile device of the plurality of mobile devices to a respective communication device of a plurality of communication devices, the livestreamed video via the respective instance of the application, wherein the plurality of communication devices comprises the communication device.

17. A non-transitory, computer-readable medium storing code comprising instructions which, when executed by one or more processors of a mobile device, cause the mobile device to:

establish, by the mobile device, a connection with a vehicle that comprises a set of cameras, the mobile device being separate from the vehicle;

activate, via the mobile device, an application installed at the mobile device;

transmit, from the mobile device to a communication device different than the mobile device and separate from the vehicle, and via the application installed at the mobile device, an indication of one or more cameras of the set of cameras of the vehicle that are accessible by the mobile device;

receive, at the mobile device from the communication device via the application installed at the mobile device, a selection of a camera of the indicated one or more cameras of the set of cameras of the vehicle;

receive, at the mobile device, livestreamed video from the selected camera of the vehicle based at least in part on the received selection from the communication device;

establish, by the application installed at the mobile device, a communication session between the mobile device and the communication device; and transmit, from the mobile device to the communication device via the application installed at the mobile device, the livestreamed video from the selected camera of the vehicle based at least in part on establishing the communication session.

18. The non-transitory, computer-readable medium of claim 17, wherein the instructions, when executed by the one or more processors of the mobile device, further cause the mobile device to:

transmit, from the mobile device to the vehicle based at least in part on establishing the connection with the vehicle, an inquiry as to whether the vehicle supports sharing the livestreamed video obtained by the vehicle; and receive, from the vehicle based at least in part on transmitting the inquiry, an indication that the vehicle supports sharing the livestreamed video, wherein the livestreamed video is received at the mobile device based at least in part on receiving the indication.

19. The non-transitory, computer-readable medium of claim 17, wherein the instructions, when executed by the one or more processors of the mobile device, further cause the mobile device to:

associate, by the application during an initial setup procedure, a first identifier of the vehicle with an account of a user of the application; and authorize, based at least in part on completing the initial setup procedure, the account of the user to establish mappings providing other accounts of other users access to respective combinations of cameras installed on the vehicle, the cameras comprising the selected camera.

20. The non-transitory, computer-readable medium of claim 17, wherein the instructions, when executed by the one or more processors of the mobile device, further cause the mobile device to:

receive, at the mobile device based at least in part on activating the application, an indication of the set of cameras of the vehicle.

21. The non-transitory, computer-readable medium of claim 17, wherein the instructions, when executed by the one or more processors of the mobile device, further cause the mobile device to:

establish, by a plurality of mobile devices, respective connections with the vehicle, each mobile device of the plurality of mobile devices running a respective instance of the application, wherein the plurality of mobile devices comprises the mobile device;

receive, at the plurality of mobile devices from the vehicle, the livestreamed video based at least in part on establishing the respective connections with the vehicle; and transmit, from each mobile device the plurality of mobile devices to a respective communication device of a plurality of communication devices, the livestreamed video via the respective instance of the application, wherein the plurality of communication devices comprises the communication device.

* * * * *